US012460945B2

(12) United States Patent
Cheng et al.

(10) Patent No.: US 12,460,945 B2
(45) Date of Patent: Nov. 4, 2025

(54) MAGNETIC DRUM AND MAGNETIC ENCODER WITH THE SAME

(71) Applicant: Shenzhen Radimag Magnets Co., Ltd., Guangdong (CN)

(72) Inventors: Wenhao Cheng, Guangdong (CN); Yan Wang, Guangdong (CN); Muyang Cheng, Guangdong (CN); Huaiyin Meng, Guangdong (CN); Xin Wang, Guangdong (CN)

(73) Assignee: SHENZHEN RADIMAG MAGNETS CO., LTD., Shenzhen (CN)

( * ) Notice: Subject to any disclaimer, the term of this patent is extended or adjusted under 35 U.S.C. 154(b) by 140 days.

(21) Appl. No.: 18/557,012

(22) PCT Filed: Dec. 10, 2021

(86) PCT No.: PCT/CN2021/137085
§ 371 (c)(1),
(2) Date: Oct. 24, 2023

(87) PCT Pub. No.: WO2022/237150
PCT Pub. Date: Nov. 17, 2022

(65) Prior Publication Data
US 2024/0230374 A1 Jul. 11, 2024

(30) Foreign Application Priority Data

May 13, 2021 (CN) .......................... 202110522321.8

(51) Int. Cl.
G01D 5/12 (2006.01)
(52) U.S. Cl.
CPC ..................... G01D 5/12 (2013.01)

(58) Field of Classification Search
CPC .......... H01F 7/02; H01F 7/0205; H01F 7/021; G01P 3/44; G01P 3/48; G01P 3/481;
(Continued)

(56) References Cited

U.S. PATENT DOCUMENTS 5,250,865 A * 10/1993 Meeks ................ F16C 32/0465
310/90.5
5,325,056 A * 6/1994 Shonowaki ............. H03M 1/30
324/207.21
(Continued)

FOREIGN PATENT DOCUMENTS

| CN | 101964236 A | 2/2011 |
| CN | 104374412 A | 2/2015 |

(Continued)

OTHER PUBLICATIONS

International Search Report of PCT/CN2021/137085.
Written Opinion of PCT/CN2021/137085.

Primary Examiner — Huy Q Phan
Assistant Examiner — David B Frederiksen

(57) ABSTRACT

A magnetic drum and a magnetic encoder including same. The magnetic drum comprises a permanent magnet magnetic ring body (1); the permanent magnet magnetic ring body (1) comprises an inner ring wall (11) and an outer ring wall (12); the inner ring wall (11) has a single first polarity, the outer ring wall (12) has a single second polarity, and the first polarity is opposite to the second polarity; the inner ring wall (11) and the outer ring wall (12) are coaxially arranged; one of the inner ring wall (11) and the outer ring wall (12) is uniformly provided with a plurality of protrusions (13) around the axis of the permanent magnet magnetic ring body (1), and a recess (14) is formed between any two adjacent protrusions (13).

13 Claims, 5 Drawing Sheets

(58) Field of Classification Search
CPC . G01P 3/487; G01D 5/12; G01D 5/14; G01D 5/244; G01D 5/245; G01D 5/2451
See application file for complete search history.

(56) References Cited

U.S. PATENT DOCUMENTS

| | | | | |
|---|---|---|---|---|
| 5,763,971 | A * | 6/1998 | Takahata | F16C 32/0438 |
| | | | | 310/90.5 |
| 6,806,605 | B1 * | 10/2004 | Gabrys | H02K 7/09 |
| | | | | 310/90 |
| 8,085,036 | B2 * | 12/2011 | Ausserlechner | G01D 5/2451 |
| | | | | 324/207.25 |
| 2002/0105445 | A1 * | 8/2002 | Shirai | G01D 5/24476 |
| | | | | 341/15 |
| 2003/0062890 | A1 * | 4/2003 | Tokumoto | G01L 3/104 |
| | | | | 324/207.25 |

FOREIGN PATENT DOCUMENTS

| | | | |
|---|---|---|---|
| CN | 107328016 | A | 11/2017 |
| CN | 113155158 | A | 7/2021 |
| CN | 215064570 | U | 12/2021 |
| JP | 2008292275 | A | 12/2008 |
| JP | 2015132496 | A * | 7/2015 |

\* cited by examiner

MAGNETIC DRUM AND MAGNETIC ENCODER WITH THE SAME

CROSS-REFERENCE TO RELATED APPLICATIONS

This Application is a national stage application of PCT/CN2021/137085. The present disclosure claims priorities from PCT Application No. PCT/CN2021/137085, filed Dec. 10, 2022 and from Chinese Patent Application 202110522321.8 filed to the SIPO on May 13, 2021 and entitled "MAGNETIC DRUM AND MAGNETIC ENCODER WITH THE SAME", the disclosure of which is hereby incorporated by reference in its entirety.

TECHNICAL FIELD

The present disclosure belongs to the technical field of magnetic encoder design, and particularly relates to a magnetic drum and a magnetic encoder with the same.

BACKGROUND ART

The magnetic encoder is an angle or displacement measurement device mainly composed of a magnetoresistive sensor, a magnetic drum and a signal processing circuit. Due to its various advantages such as small size, high precision, high resolution, no contact and wear, high shock resistance, easy installation, long service life and many interface forms, the magnetic encoder is widely applied in the electromechanical industry or other industries.

The number of magnetic poles on the magnetic drum determines the resolution of the magnetic encoder, the uniformity of the magnetic poles on the magnetic drum determines the quality of the output signal of the magnetic encoder, and the magnetic strength and operating distance of the magnetic poles on the magnetic drum determine the structure and volume of the magnetic encoder. In short, the magnetic drum has a very important impact on the anisotropic performance parameter of the magmatic encoder, and many properties of the magnetic drum are also inseparable from the structure of the magnetic signal source on its circumference.

As shown in FIG. 1, the magnetic drum of the magnetic encoder is mainly composed of a permanent magnetic ring a, a support ring b and a rotating shaft c, etc. If the permanent magnetic ring on the outer circumferential surface of the magnetic drum is unfolded, the arrangement of magnetic poles on the surface is shown in FIG. 2, and the sectional magnetic pole structure in the unfolded diagram of permanent magnets on the outer circumferential surface of the magnetic drum is shown in FIG. 3. The magnetic drum with this structure is characterized in that the magnetic signal source comes from the N and S poles of the magnetic magnets distributed at intervals on the circumference of the magnetic drum. However, the magnetic drum with this structure has the following defects. Firstly, with the increase of the number of magnetic poles, the proportion of the closed loop formed by magnetic lines of force between adjacent magnetic poles is greatly increased, so that the operating distance of the magnetic field is reduced rapidly, the magnetic signals received by the magnetoresistive sensor are weakened, and the quality of the output signal of the magnetic encoder is reduced; and, the number of magnetic poles on the magnetic drum has an important impact on the resolution of the magnetic encoder. Secondly, there is a non-magnetic area between the N pole and the S pole on the magnetic drum, and the uniformity, width and shape of the non-magnetic area determine the uniformity, width and shape of the magnetic signal and further determine the quality of the output signal of the magnetic encoder. At present, the uniformity of the magnetic signal source on the magnetic drum can only be controlled by magnetizing, but the manufacturing process of high-quality magnetic drums is very complicated and difficult to ensure uniformity. The objective of the present disclosure is to overcome the above defects of the magnetic signal source on the magnetic drum widely used at present.

SUMMARY

Hence, the present disclosure provides a magnetic drum and a magnetic encoder with the same to overcome the defect that the quality of the output signal is low when a radially-magnetized magnetic ring is used as a magnetic signal source of a magnetic encoder in the related art.

To solve the above problem, the present disclosure provides a magnetic drum including a permanent magnetic ring body, wherein the permanent magnetic ring body includes an inner ring wall and an outer ring wall; the inner ring wall has a single first polarity, the outer ring wall is a single second polarity, and the first polarity is opposite to the second polarity; the inner ring wall and the outer ring wall are coaxially arranged; a plurality of protrusions are uniformly provided on one of the inner ring wall and the outer ring wall around the axis of the permanent ring wall body; and, a recess is formed between any two adjacent protrusions.

In some implementations, the maximum circumferential width of the radial opening of the recess is L, the radial height of the protrusion is H, and L>0.1 H.

In some implementations, L>0.5 H.

In some implementations, the magnetic drum further includes a support ring, an outer ring wall of which is connected to the permanent magnetic ring body and an inner ring wall of which is connected to a rotating shaft.

In some implementations, the shape of the protrusions is one of rectangle, isosceles trapezoid, isosceles triangle and circular arc when the protrusions are projected on any radial plane of the permanent magnetic ring body.

In some implementations, the permanent magnetic ring body is a radially-oriented magnetic ring or an isotropic magnetic ring with unipolar magnetization characteristics.

In some implementations, the radially-oriented magnetic ring is made of at least one of NdFeB, SmCo, AlNiCo and ferrite permanent magnets; and/or, the isotropic magnetic ring with unipolar magnetization characteristics is made of at least one of NdFeB and SmCo permanent magnets.

The present disclosure further provides a magnetic encoder, including the magnetic drum described above.

In the magnetic drum and the magnetic encoder with the same, on one hand, since the permanent magnetic ring body with a single magnetic pole is used as the magnetic signal source of the magnetic drum, the protrusions and recesses have the same magnetic poles (either the same N poles or the same S poles). Even if the protrusions and recesses have a very small width, the magnetic lines of force between the both will not form a closed loop, the strength of the magnetic field at the protrusions will not be weakened much, and the magnetic signals received by the magnetoresistive sensor will not be weakened much. That is, the defect that the magnetic signals detected by the magnetoresistive sensor are weakened much due to the closed loop formed by the magnetic lines of force between magnetic poles when the interval between magnetic poles is very small on the commonly used magnetic drum with N poles and S poles arranged at intervals on its outer surface is overcome. On the other hand, the strength of the magnetic field at the protrusions is high and the strength of the magnetic field at the recesses is low, and the transition area (non-magnetic area) between the N pole and the S pole on the surface of the commonly used magnetic drum is not present between the protrusions and the recesses, so the magnetic signals received by the magnetoresistive sensor in the magnetic encoder are clearer, and the quality of the output signal of the magnetic encoder can be improved greatly. Furthermore, the permanent magnetic ring body (e.g., the radially-oriented magnetic ring) with protrusions and recesses can be manufactured based on the radially-oriented magnetic ring by machining (e.g., laser cutting), the related size (e.g., width, depth, height and shape) of the protrusions and the recesses can be controlled accurately, and the parameters of the magnetic field (e.g., the difference in the strength of the magnetic field, the strength of magnetic signals, the shape of magnetic shapes, etc.) between the protrusions and the recesses are controlled. Thus, the magnetic signals received by the magnetoresistive sensor in the magnetic encoder are personalized magnetic signals that have been elaborately edited and optimized, instead of simple strength signals of the magnetic field of N and S poles, so that higher-quality magnetic encoders that can satisfy special detection requirements are manufactured.

in which:

1: permanent magnetic ring body; 11: inner ring wall; 12: outer ring wall; 13: protrusion; and, 14: recess.

DETAILED DESCRIPTION

Figure 1:
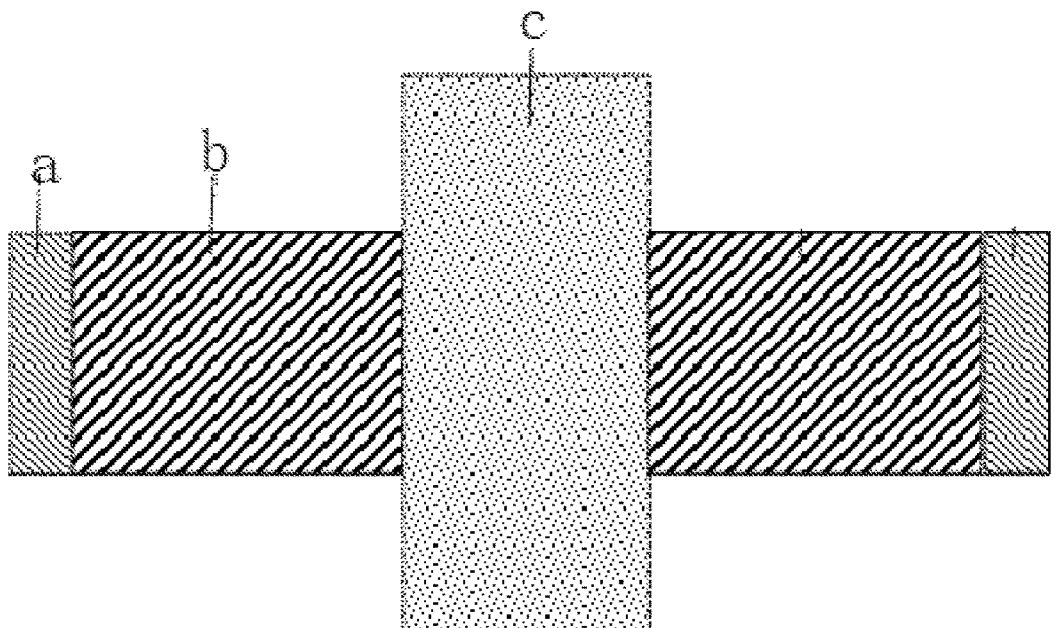
FIG. 1 is an internal structure diagram of a magnetic drum in the prior art.
Figure 2:
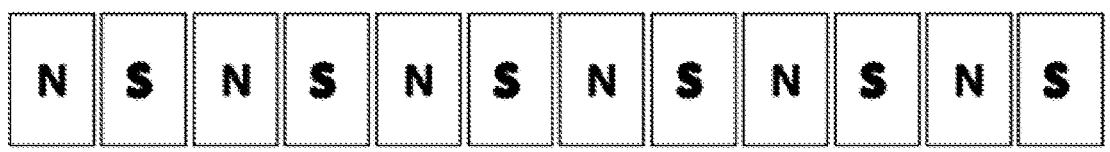
FIG. 2 is an unfolding diagram of the outer circumferential surface of the radially-magnetized magnetic ring (multi-pole magnetic ring) used in the magnetic drum in the prior art.
Figure 3:
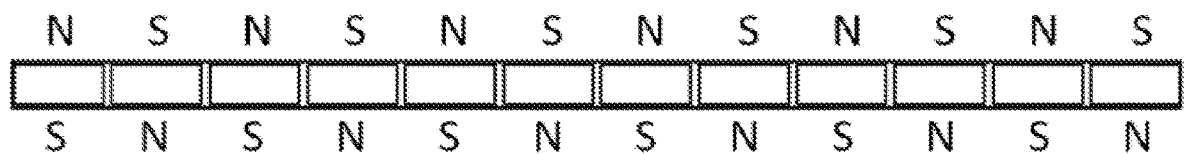
FIG. 3 is a sectional diagram (radially sectional view) of the radially-magnetized magnetic ring (multi-pole magnetic ring) in FIG. 2.
Figure 4:
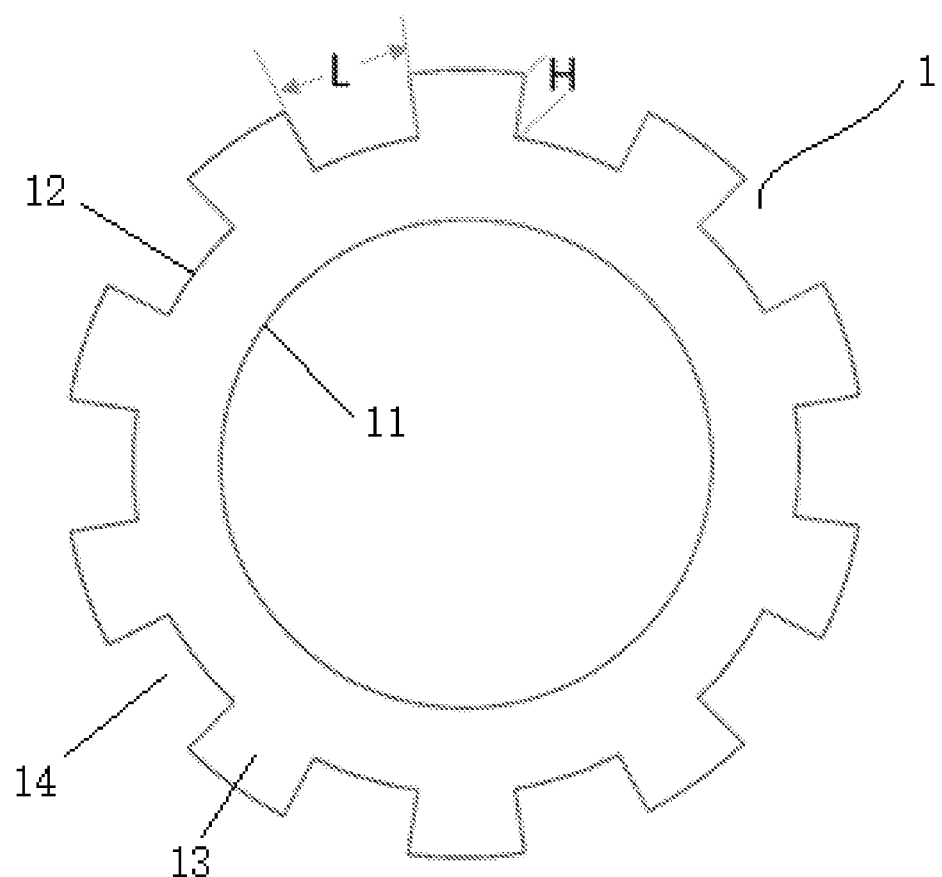
FIG. 4 is a schematic structure diagram of a permanent magnetic ring body of a magnetic drum according to an embodiment of the present disclosure.
Figure 5:
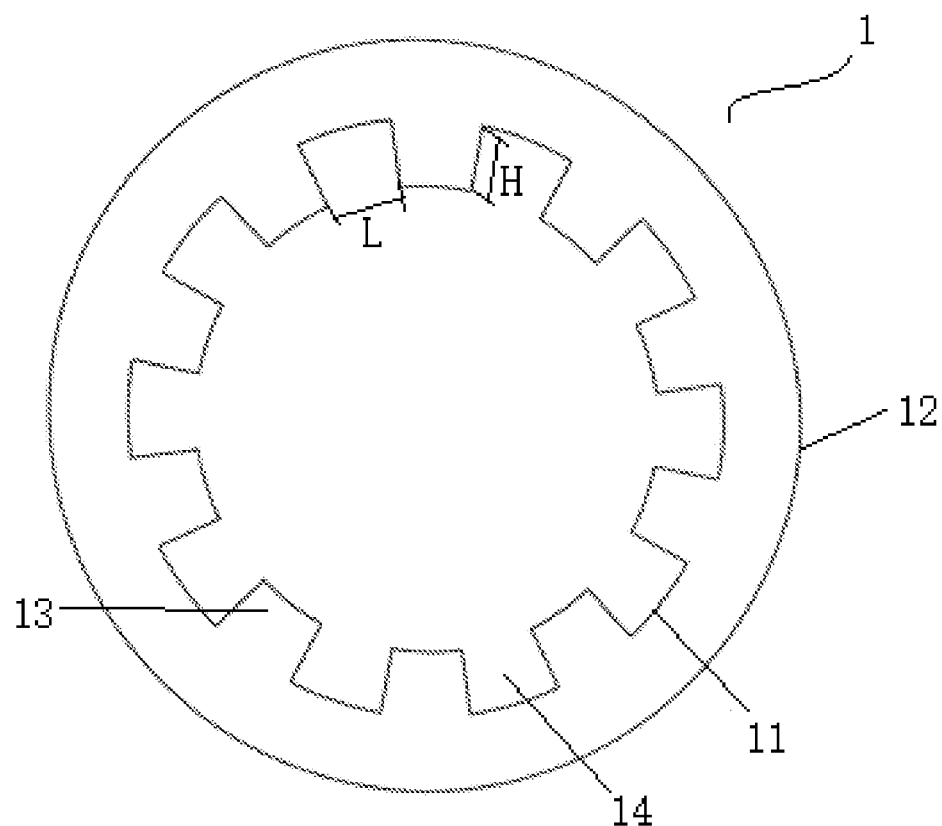
FIG. 5 is another schematic structure diagram of the permanent magnetic ring body of the magnetic drum according to an embodiment of the present disclosure.
Figure 6:
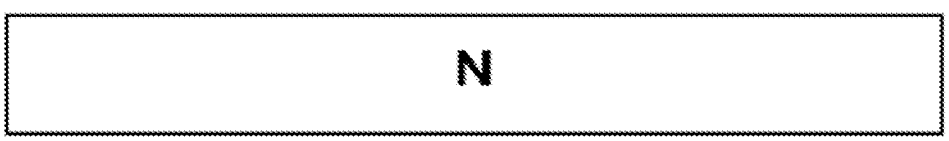
FIG. 6 is an unfolding diagram of the outer circumferential surface when the outer ring wall of the permanent magnetic ring body in FIG. 4 is a single N pole.
Figure 7:
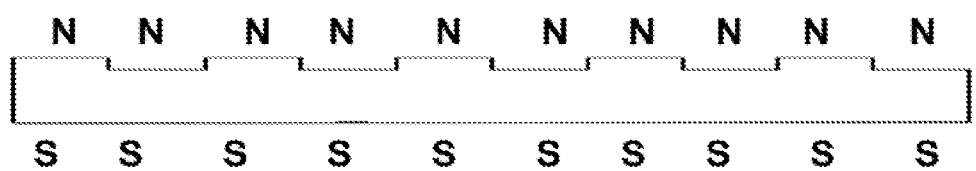
FIG. 7 is a sectional view (radially sectional view) of the permanent magnetic ring body in FIG. 6.

With reference to FIGS. 1-10, in accordance with an embodiment of the present disclosure, a magnetic drum is provided, including a permanent magnetic ring body 1. The permanent magnetic ring body 1 includes an inner ring wall 11 and an outer ring 12. The inner ring wall 11 has a single first polarity, the outer ring wall 12 has a single second polarity, and the first polarity is opposite to the second polarity (that is, when the first polarity is an N pole, the second polarity is an S pole; on the contrary, when the first polarity is an S pole, the second polarity is an N pole). The inner ring wall 11 and the outer ring wall 12 are coaxially arranged, a plurality of protrusions 13 are uniformly provided on one of the inner ring wall 11 and the outer ring wall 12 around the axis of the permanent ring wall body 1, and a recess 14 is formed between any two adjacent protrusions 13. Unlike the multi-pole magnetic ring in the prior art, the inner ring wall 11 and the outer ring wall 12 of the permanent magnetic ring body 1 in this technical solution correspond to one of the N pole and the S pole in the magnetic poles, respectively, that is, the inner ring wall 11 is a single magnetic pole and the outer ring wall 12 is another single magnetic pole. When it is assumed that the outer ring wall 12 is an N pole, the corresponding inner ring wall 11 is an S pole at this embodiment. Specifically referring to FIGS. 6 and 7, the circumferential surface of the permanent magnetic ring body 1 is unfolded, and the arrangement of magnetic poles on its outer surface is a single N pole as shown in FIG. 6; and, the sectional view of the permanent magnetic ring body 1 corresponding to FIG. 6 is FIG. 7, where the upper side corresponding to the outer surface of the magnetic drum is an N pole of a concave-convex structure, and the lower side corresponding to the inner surface of the magnetic drum is an S pole. It should be understood that the specific arrangement of the protrusions 13 and the recesses 14 are based on which one of the inner ring wall 11 and the outer ring wall 12 is selected as the detection surface. Specifically, when the outer ring wall 12 is used as the detection surface (which is used in pair with the magnetoresistive element), the protrusions 13 and the recesses 14 are arranged on the outer ring wall 12; on the contrary, when the inner ring wall 11 is used as the detection surface, the protrusions 13 and the recesses 14 are arranged on the inner ring wall 11.

In this technical solution, on one hand, since the permanent magnetic ring body with a single magnetic pole is used as the magnetic signal source of the magnetic drum, the protrusions 13 and recesses 14 have the same magnetic poles (either the same N poles or the same S poles). Even if the protrusions 13 and recesses 14 have a very small width, the magnetic lines of force between the both will not form a closed loop, the strength of the magnetic field at the protrusions 13 will not be weakened much, and the magnetic signals received by the magnetoresistive sensor will not be weakened much. That is, the defect that the magnetic signals detected by the magnetoresistive sensor are weakened much due to the closed loop formed by the magnetic lines of force between magnetic poles when the interval between magnetic poles is very small on the commonly used magnetic drum with N poles and S poles arranged at intervals on its outer surface is overcome. On the other hand, the strength of the magnetic field at the protrusions 13 is high and the strength of the magnetic field at the recesses 14 is low, and the transition area (non-magnetic area) between the N pole and the S pole on the surface of the commonly used magnetic drum is not present between the protrusions 13 and the recesses 14, so the magnetic signals received by the magnetoresistive sensor in the magnetic encoder are clearer, and the quality of the output signal of the magnetic encoder can be improved greatly. Furthermore, the permanent magnetic ring body (e.g., the radially-oriented magnetic ring) with protrusions 13 and recesses 14 can be manufactured based on the radially-oriented magnetic ring by machining (e.g., laser cutting), the related size (e.g., width, depth, height and shape) of the protrusions 13 and the recesses 14 can be controlled accurately, and the parameters of the magnetic field (e.g., the difference in the strength of the magnetic field, the strength of magnetic signals, the shape of magnetic shapes, etc.) between the protrusions 13 and the recesses 14 are controlled. Thus, the magnetic signals received by the magnetoresistive sensor in the magnetic encoder are personalized magnetic signals that have been elaborately edited and optimized, instead of simple strength signals of the magnetic field of N and S poles, so that higher-quality magnetic encoders that can satisfy special detection requirements are manufactured.

Figure 8:
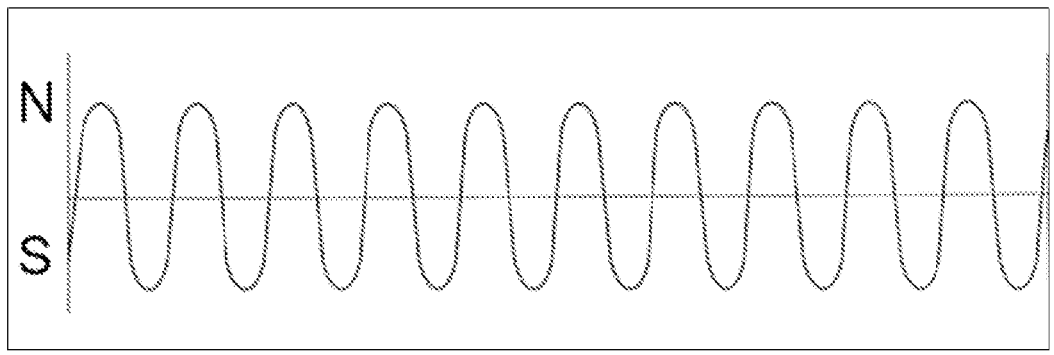
FIG. 8 is a waveform diagram of the magnetic field on the outer surface (the magnetic poles are alternating N poles and S poles) of the magnetic drum using the radially-magnetized magnetic ring (multi-pole magnetic ring) in the prior art.
Figure 9:
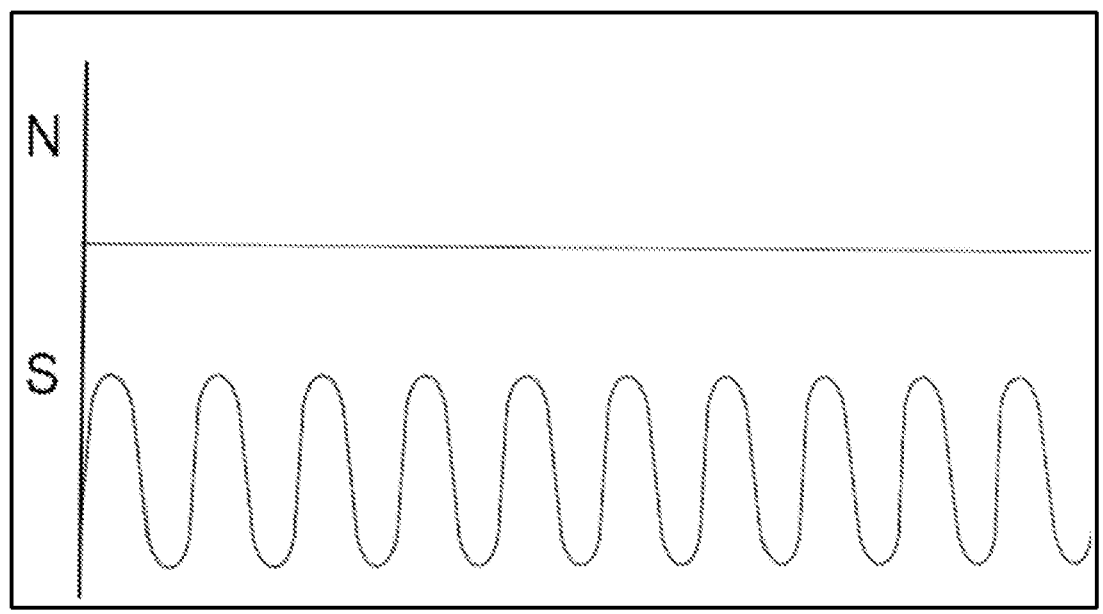
FIG. 9 is a waveform diagram of the magnetic field on the outer surface (the magnetic poles are single magnetic S poles) on the outer surface of the magnetic drum using the permanent magnetic ring body according to the present disclosure.
Figure 10:
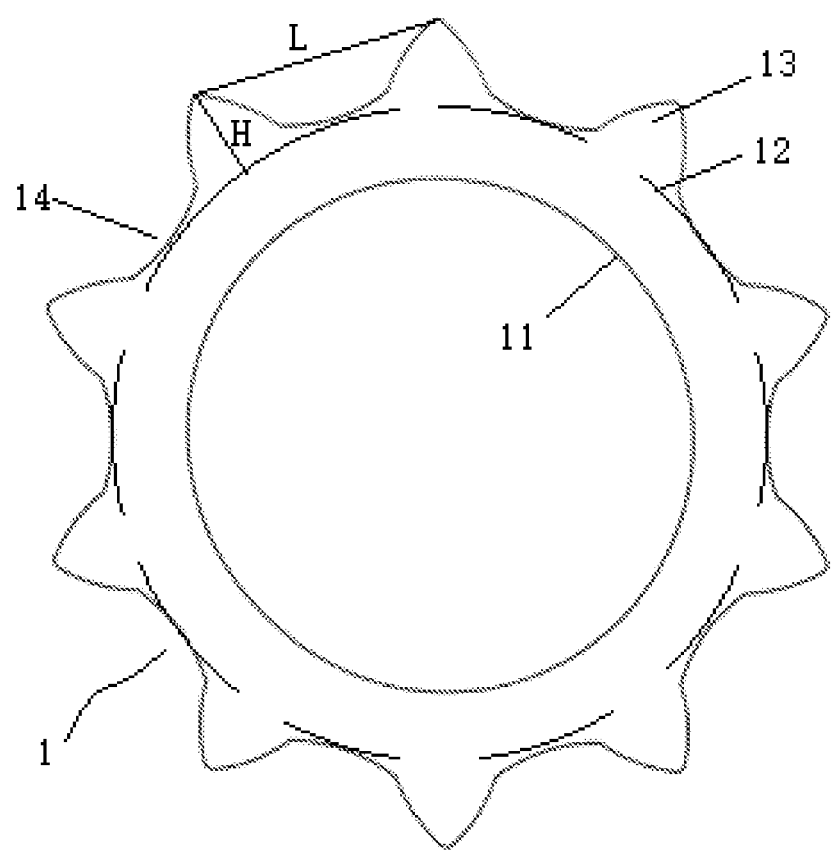
FIG. 10 is another schematic structure diagram of the permanent magnetic ring body of the magnetic drum according to an embodiment of the present disclosure.

FIG. 8 is a waveform diagram of the magnetic field on the outer surface of the magnetic drum using the radially-magnetized magnetic ring (multi-pole magnetic ring) in the prior art. It can be seen that the magnetic field on the surface of the magnetic drum is composed of an N pole and an S pole, which are located on the upper and lower parts of the X axis, respectively. FIG. 9 is a waveform diagram of the magnetic field on the outer surface on the outer surface of the magnetic drum according to the present disclosure. It can be seen that the magnetic signals are all located below the X axis, that is, the surface of the magnetic drum is the S pole.

In some implementations, the maximum circumferential width of the radial opening of the recess 14 is L, the radial height of the protrusion 13 is H, and L>0.1 H. In some implementations, L>0.5 H, thereby ensuring that the difference in the strength of the magnetic field between the corresponding positions of the magnetic drum and the protrusions 13 and recesses 14 can obtain the best detection resolution.

The magnetic drum can be fixedly connected to the corresponding rotating shaft through the inner ring wall 11 of the permanent magnetic ring body 1. To facilitate the connection between the permanent magnetic ring body 1 and the rotating shaft, the magnetic drum further includes a support ring, an outer ring wall of which is connected to the permanent magnetic ring body 1 and an inner ring wall of which is connected to the rotating shaft. Under such circumstance, the inner ring wall of the support ring can be machined as a necessary connection structure, e.g., a key slot (which may be a spline or a flat key), so that it is more convenient for the disassembly of the magnetic drum.

In some cases, corresponding protrusions and recesses may also be appropriately designed on the ring wall of the inner ring wall 11 and the outer ring wall 12 that is not used as the detection surface.

The shape of the protrusions 13 is one of rectangle, isosceles trapezoid, isosceles triangle and circular arc when the protrusions 13 are projected on any radial plane of the permanent magnetic ring body 1. It is to be noted that the specific shape of the protrusions 13 will not be specially limited in the present disclosure. Regardless of the specific shape, the plurality of protrusions 13 should have a central symmetrical structure respect to the axis of the permanent magnetic ring body 1, so as to satisfy the requirements the protrusions 13 as the magnetic signal source of the encoder.

In some implementations, the permanent magnetic ring body 1 is a radially-oriented magnetic ring or an isotropic magnetic ring with unipolar magnetization characteristics.

In some implementations, the radially-oriented magnetic ring is made of at least one of NdFeB, SmCo, AlNiCo and ferrite permanent magnets. That is, the radially-oriented magnetic ring may be made of a single material, or may be compounded by multiple materials. The isotropic magnetic ring with unipolar magnetization characteristics is made of at least one of NdFeB and SmCo permanent magnets.

In accordance with an embodiment of the present disclosure, a magnetic encoder is further provided, including the magnetic drum described above. It should be understood that the magnetic encoder further includes the magnetoresistive sensor and the corresponding signal processing circuit. This part is the conventional technology of the magnetic encoder and will not be described here.

It should be readily understood by those skilled in the art that the above advantages can be freely combined and superimposed if not conflicted.

The above description merely shows the preferred embodiments of the present disclosure and is not intended to limit the present disclosure. Any modification, equivalent replacement or improvement made without departing from the spirit and principle of the present disclosure shall fall into the protection scope of the present disclosure. The above description merely shows the preferred implementations of the present disclosure, and it should be pointed out that, to a person of ordinary skill in the art, various improvements and modifications can be made without departing from the technical principle of the present disclosure and these improvements and modifications shall be regarded as falling into the protection scope of the present disclosure.

The invention claimed is:

1. A magnetic drum, comprising:
a permanent magnetic ring body, wherein the permanent magnetic ring body comprises an inner ring wall and an outer ring wall; the inner ring wall has a single first polarity, the outer ring wall is a single second polarity, and the first polarity is opposite to the second polarity; the inner ring wall and the outer ring wall are coaxially arranged around an axis of the permanent ring wall body; a plurality of protrusions are uniformly provided on the outer ring wall around the axis of the permanent ring wall body and are projected on a radial plane of the permanent magnetic ring body; and, a plurality of recesses are uniformly formed on the radial plane of the permanent magnetic ring body between the plurality of protrusions and each recess of the plurality of the recessed is formed between any two adjacent protrusions; and wherein a maximum circumferential width of a radial opening of the recess is L, a radial height of the protrusion is H, and L>0.1H; and the plurality of protrusions should have a central symmetrical structure respect to the axis of the permanent magnetic ring body, so as to satisfy requirements the protrusions as a magnetic signal source of the encoder; and the protrusions and recesses have the same magnetic poles; and strength of a magnetic field at the protrusions is higher than the strength of the magnetic field at the recesses; and on the outer surface of the magnetic drum, a waveform diagram of the magnetic field is formed on the outer surface.

2. The magnetic drum according to claim 1, wherein L>0.5H.

3. The magnetic drum according to claim 1, further comprising a support ring, an outer ring wall of which is connected to the permanent magnetic ring body and an inner ring wall of which is connected to a rotating shaft.

4. The magnetic drum according to claim 1, wherein a shape of the protrusions is one of rectangle, isosceles trapezoid, isosceles triangle and circular arc when the protrusions are projected on any radial plane of the permanent magnetic ring body.

5. The magnetic drum according to claim 1, wherein the permanent magnetic ring body is a radially-oriented magnetic ring or an isotropic magnetic ring with unipolar magnetization characteristics.

6. The magnetic drum according to claim 5, wherein the radially-oriented magnetic ring is made of at least one of NdFeB, SmCo, AlNiCo and ferrite permanent magnets; and/or, the isotropic magnetic ring with unipolar magnetization characteristics is made of at least one of NdFeB and SmCo permanent magnets.

7. A magnetic encoder, comprising a magnetic drum, wherein the magnetic drum is the magnetic drum according to claim 1.

8. The magnetic encoder of claim 7, wherein the maximum circumferential width of the radial opening of the recess is L, the radial height of the protrusion is H, and L>0.1H.

9. The magnetic encoder of claim 8, wherein L>0.5H.

10. The magnetic encoder of claim 7, further comprising a support ring, an outer ring wall of which is connected to the permanent magnetic ring body (1) and an inner ring wall of which is connected to a rotating shaft.

11. The magnetic encoder of claim 7, wherein a shape of the protrusions is one of rectangle, isosceles trapezoid, isosceles triangle and circular arc when the protrusions are projected on any radial plane of the permanent magnetic ring body.

12. The magnetic encoder of claim 7, wherein the permanent magnetic ring body is a radially-oriented magnetic ring or an isotropic magnetic ring with unipolar magnetization characteristics.

13. The magnetic encoder of claim 12, wherein the radially-oriented magnetic ring is made of at least one of NdFeB, SmCo, AlNiCo and ferrite permanent magnets; and/or, the isotropic magnetic ring with unipolar magnetization characteristics is made of at least one of NdFeB and SmCo permanent magnets.

* * * * *